Dec. 16, 1969   E. C. MOELLER   3,483,906
METHOD AND APPARATUS FOR FEEDING MATERIALS
Filed Aug. 28, 1967   2 Sheets-Sheet 1

INVENTOR.
EUGENE CHARLES MOELLER
BY Bruce C Lutz
ATTORNEY

Dec. 16, 1969  E. C. MOELLER  3,483,906

METHOD AND APPARATUS FOR FEEDING MATERIALS

Filed Aug. 28, 1967  2 Sheets-Sheet 2

INVENTOR.
EUGENE CHARLES MOELLER

BY Bruce C Lutz

ATTORNEY

United States Patent Office 3,483,906
Patented Dec. 16, 1969

3,483,906
METHOD AND APPARATUS FOR
FEEDING MATERIALS
Eugene Charles Moeller, Spearfish, S. Dak.
(Box 278, Mead, Colo. 80542)
Filed Aug. 28, 1967, Ser. No. 663,666
Int. Cl. A01d 57/00; B02c 23/02; B67d 5/64
U.S. Cl. 146—123                                    4 Claims

ABSTRACT OF THE DISCLOSURE

Feeder apparatus for distributing material to grinding apparatus. The apparatus consists of a hopper with means to oscillate the hopper in a slow advance stroke and a rapid return stroke and during this movement the hopper is also raised and suddenly lowered so as to feed material toward a grinder located in the bottom of the hopper.

THE INVENTION

This invention is generally related to distributing apparatus and more particularly to feed means for uniformly distributing material to an outlet to be utilized in some way such as grinding.

The prior art has feeding apparatus such as a patent to Oberwortman 2,650,745, issued Sept. 1, 1953. However, such apparatus has suffered from various deficiencies such as not being able to feed properly when the hopper is nearly empty and wasting space by the inclusion of a centrally located member within the hopper for helping the feeding operation.

The present invention on the other hand obtains its feeding action by oscillating the hopper in short strokes. An advance stroke occurs smoothly and relatively slowly while the return stroke is relatively rapid. The inertia of the material being fed to an outlet is such that it cannot follow the hopper on the return stroke and thus advances toward the outlet in the hopper. In other words, the material advances with respect to the hopper during each complete cycle of operation. An additional improvement provides for raising the hopper during each cycle and suddenly lowering the hopper during the return cycle so as to reduce frictional forces between the material and the bottom of the hopper and thereby enhance the advancement of the material.

It is theretfore an object of this invention to provide improved feeding apparatus.

Further objects and advantages of this invention will become apparent from a reading of the specification and appended claims in conjunction with the drawings wherein:

Figure 1:
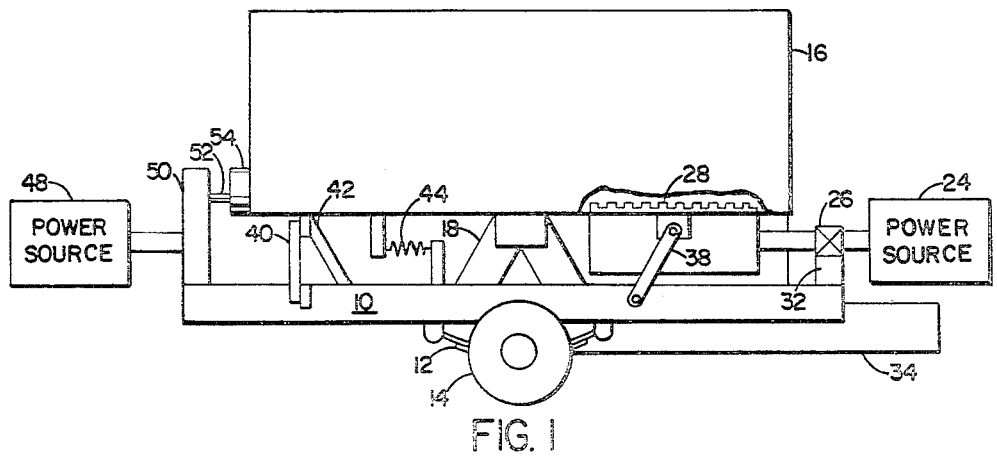
FIGURE 1 is a side view, partly in section, of apparatus embodying the invention.
Figure 2:
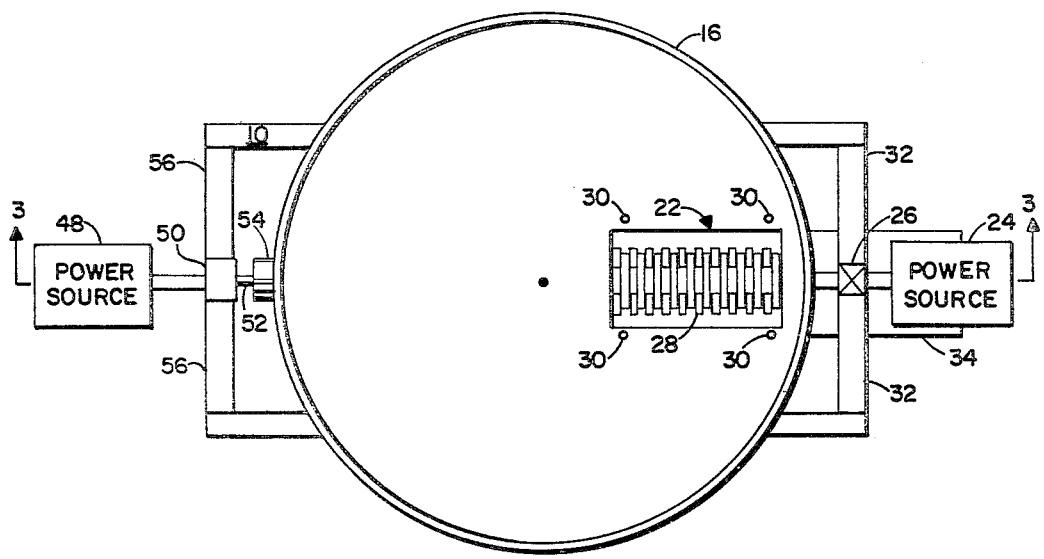
FIGURE 2 is a plan view of the apparatus of FIGURE 1.
Figure 3:
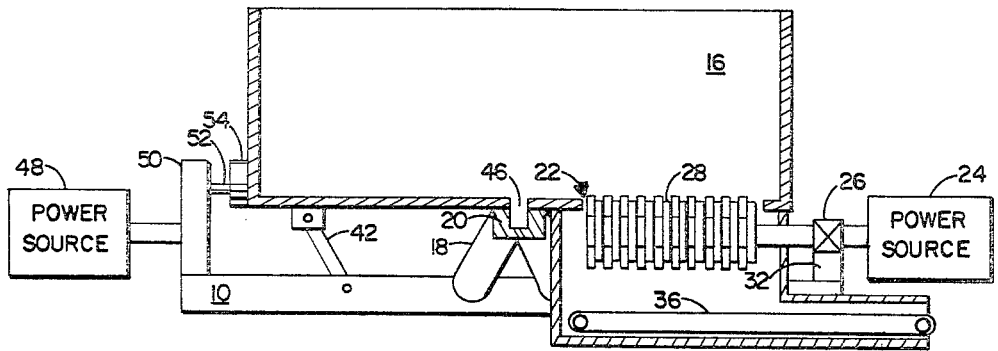
FIGURE 3 is a cross-sectional view of FIGURE 2 along lines 3—3.
Figure 4:
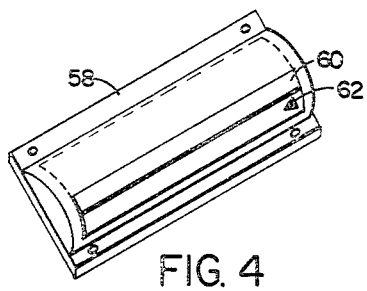
FIGURE 4 shows a valve for use with the apparatus of FIGURE 1.

In FIGURE 1 a base or support means 10 is shown attached by suspension means 12 to wheels 14. A hopper, holding means or dispensing means 16 is centrally supported from the base 10 by members 18. A section of hopper 16 is removed to more clearly show a grinding drum to be later described. The members are attached to a pivotal connection 20 more clearly shown in FIGURE 3. The hopper as shown in a cylindrical open ended drum which has a further opening 22 in the bottom thereof as more clearly shown in FIGURE 2. In describing my invention the same numbers will be used in the first three figures to described the same parts and further references will not be made to individual figures. A first rotating power source or driving means 24 is connected through a transmission and/or clutch or energy converting means 26 to a rotatable grinding drum, chopping means or cylinder 28 situated within and below the opening 22 of hopper 16. Four holes 30 are shown around opening 22 for attaching a variable opening cover as shown in FIGURE 4. Transmission 26 is supported from base 10 by members 32. Beneath drum 28 is situated a discharge means or chute 34 for receiving material being distributed from the hopper 16. Within chute 34 is a conveyer 36 for transporting materials to the end of chute 34.

Hopper 16 is further supported by four legs or angled members. Three of these members are shown and are designated as 38, 40 and 42. Each of the angled members are pivotally connected at opposite ends thereof to the base 10 and the hopper 16. Each of the angled members are situated at approximately ninety degree points on the hopper and each is angled in a different from the other members and at right angles to adjacent angled members. Thus, as can be observed by those skilled in the art, if the central support means 18 and 20 were removed, the hopper would rise in one direction of rotation and would lower from the position shown in the other direction of rotation. Since the central support is attached, the hopper can only rise from the position shown and lower back to that position. A biasing means or spring 44 is shown attached between hopper 16 and base 10 to attempt to keep the hopper in the position shown. The hopper 16 is permitted to rise from the pivotal support 20 since a pivot point designated as 46 at the base of hopper 16 is merely positioned within the support 20 and is not fixedly attached thereto.

A power source or driving means 48, which may be the same as source 24, transmits power through a freewheeling transmission and/or clutch or energy converting means 50 and a shaft 52 to a motion converting means generally designated as 54. Means 50 is supported from base 10 by members 56. Means 54 acts to convert rotary motion into an oscillating motion which at the output thereof moves in one direction fairly slowly and in the other direction relatively rapidly. Apparatus for providing this type of motion will be shown in FIGURES 5 and 6.

In FIGURE 4 a cover 58 has a movable member 60 which cooperates therewith to produce a valve or variable opening 62. As previously mentioned, the cover 58 may be attached to the bottom of hopper 16 to reduce the size of opening 22 for feeding certain materials.

Figure 5:
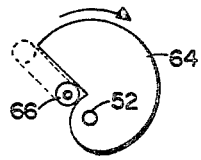

In FIGURE 5 a cam 64 which may be contained within block 54 is shown attached to the shaft 52. Cam 64 cooperates with a rolling member or bearing 66 which would be attached to hopper 16. In view of the previously mentioned angled members, the bearing 66 will move to the left and in an upwardly direction as the cam 54 rotates clockwise as shown by the dashed lines. In the position shown the bearing 66 has recently been in a far left position and has made the rapid return to the position shown.

Figure 6:
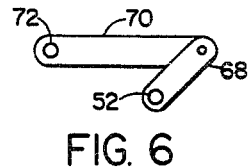
FIGURES 5 and 6 illustrates two drive mechanism embodiments for practicing the invention.

In FIGURE 6, a pair of members 68 and 70 are pivotally connected to one another at one end with member 68 being solidly connected at the other end to shaft 52. The other end of member 70 is designated as 72 and would be connected to hopper 16 to provide substantially the same motion as bearing 66 of FIGURE 5 provides as shaft 52 rotates.

While the operation of the device should be obvious to one skilled in the art from the above information, a brief description of operation will be given. Grain, fodder or other bulk material to be distributed is placed in the hopper 16. The material is advanced within and with respect to the hopper by short oscillatory motions which slowly advance the hopper 16 from a starting position and quickly return it to the starting position. The advancement may be enhanced by utilizing angled members such as 42 to raise the hopper 16 while it is being advanced but this feature is not a necessary part of the invention and is only an improvement thereupon. While the weight of the hopper will ordinarily return the hopper 16 to its starting position, a biasing means such as spring 44 will insure the prompt return thereof.

As the material is advanced, it will be fed into the opening 22. The material may be such that it will fall freely and be distributed by chute 34 or it may be desirable to grind or otherwise condition the material with means such as grinding drum 28 which is rotated by source 24. While a conveyer 36 is shown for moving the material to the end of chute 34, it could be moved by gravity alone or by a combination of gravity and means for shaking the chute 34.

The hopper in one embodiment of my invention oscillates through a distance of only one inch. Therefore while the opening 22 must be large enough to accommodate the drum during the oscillation, it need not be much larger than the portion of the drum extending above the bottom of the hopper in the uppermost position. While not shown, the drum can be made movable in a vertical direction to accommodate grinding variable amounts of material such as alfalfa being fed thereto per unit of time. The further the drum extends into the hopper, the more material will be ground.

While a working model of the invention has been built, the concept is shown in partial block diagram form to simplify the application. As mentioned, there are many methods of providing the oscillation described other than the two illustrated. Further, the angled members can be individually supported at and biased to the angle shown or to another convenient angle to eliminate the central support 18 and 20 if so desired. Other changes can also be made and still stay within the invention.

The basic invention lies in the concept of and apparatus for cycling a hopper in slow advance and rapid return strokes to advance material in the hopper to an outlet on a lower surface thereof and in the improvement of raising the hopper during the advance stroke and lowering the hopper rapidly during the return stroke to enhance the advance of the material being distributed. Therefore, although many alterations and substitutions will be apparent to those skilled in the art, I do not want to be limited to the embodiment shown or to only the obvious alterations but rather by the basic concept as described in the appended claims.

I claim:
1. Feeder apparatus of the class described comprising, in combination:
   holding means for receiving material in bulk to be distributed; base means;
   support means comprising legs pivotally connected between said base means and said holding means at an angle for raising said holding means when said holding means is being advanced from a first to a second position;
   outlet means in a lower surface of said holding means for exiting material;
   grinding means situated in said outlet means and extending vertically of the lower surface of said holding means for engaging the material as it is advanced and distributing it; and driving means for advancing said holding means from the first to the second position and then relatively rapidly returning said holding means from the second to the first position, the material in said holding means being advanced with respect to said holding means during each return to the first position.
2. Apparatus as claimed in claim 1 wherein: said holding means is a cylindrical open ended drum; and said driving means includes a rotating power source connected to said drum through means and includes a bias means for returning said drum to the second position at a rate in excess of the motion of the power source.
3. Apparatus as claimed in claim 1 wherein:
   said material is fodder;
   said grinding means comprises means for chopping the fodder; and
   said holding means drops upon return from the second to the first position.
4. Apparatus as claimed in claim 1 wherein: said driving means includes means for lowering the holding means while returning faster than it is raised upon advancing; and said holding means is cylindrical and is rotationally advanced.

References Cited

UNITED STATES PATENTS

| 2,650,745 | 9/1953 | Oberwortman | 146—123X |
| 3,146,918 | 9/1964 | Williams | 222—199 |

FOREIGN PATENTS

| 570,695 | 7/1945 | Great Britain. |

W. GRAYDON ABERCROMBIE, Primary Examiner

U.S. Cl. X.R.

146—70.1; 222—199; 722—161